United States Patent Office.

DEXTER SYMONDS, OF LOWELL, MASSACHUSETTS, ASSIGNOR TO HIMSELF, BENJAMIN WOODWARD, AND M. S. MARSHAL.

Letters Patent No. 65,137, dated May 28, 1867.

---

IMPROVED MODE OF PURIFYING AND DEODORIZING OILS.

---

The Schedule referred to in these Letters Patent and making part of the same.

---

TO ALL WHOM IT MAY CONCERN:

Be it known that I, DEXTER SYMONDS, of Lowell, in the county of Middlesex, and State of Massachusetts, have invented a new and useful improvement in the Art, Process, or Method of Deodorizing and Purifying Hydrocarbon or other Oils; and I hereby declare that the following is a full, clear, and exact description of the said art, process, or method, and of the substance or material used for deodorizing and purifying such oils.

This invention consists in a simple, cheap, and efficient method, process, or art, of deodorizing and purifying any oil which has an unpleasant odor, and in the use or employment of a simple and cheap substance or material for such purpose where heat is applied.

The operation of deodorizing and purifying oil by my improved process is as follows: The crude oil, or the oil to be deodorized or purified, is placed in a still made for that purpose, and to a quantity, say thirty gallons, of such oil, I add about ten gallons of strong lime-water, in about the proportion of one peck of lime to eight gallons of water, according to the strength of the lime; and I sometimes use chloride of lime for the same purpose. After the oil to be operated upon and the lime-water are put into the still, heat is applied thereto in any convenient manner. This heat is continued until the oil and lime-water have been sufficiently agitated, by boiling, to bring all the particles of oil into contact with the lime-water, which acts as a disinfectant or neutralizing agent, to neutralize or expel the unpleasant odors from the oil. Before the oil and lime-water in the still have reached a boiling point, the lighter portion of such oil begins to pass off, and continues to pass off during the boiling operation. This light oil, in its passage from the still to the condenser, in a state of vapor, passes through water strongly impregnated with lime or chloride of lime. By this process of passing the light oil through the lime-water in its passage from the still to condenser, said light oil is sufficiently deprived of its unpleasant odor, which odor could not be extracted in the still without a second distillation; but the heavy oil is sufficiently deodorized in the still, as it does not pass off in vapor, but remains in the still long enough to be acted upon by the lime-water therein.

If the oil operated upon is to be used for heating purposes, all the products of the operation may be mixed together; and if said oil is to be used for lighting purposes, the first product of distillation is kept separate, and not mixed with the heavy oil, as such light oil is too inflammable to be used with safety.

Having fully described my invention, the process, and substance or material used, what I claim as new, and desire to secure by Letters Patent, is—

In deodorizing and purifying hydrocarbon or other oils, I claim the use of the substances or materials herein specified and in the manner set forth.

DEXTER SYMONDS.

Witnesses:
JOHN E. CRANE,
J. B. SAMUELS.